United States Patent
Fukuda

(10) Patent No.: US 12,273,637 B2
(45) Date of Patent: Apr. 8, 2025

(54) INFORMATION PROCESSING APPARATUS, INFORMATION PROCESSING METHOD, IMAGE SENSOR, AND STORAGE MEDIUM

(71) Applicant: CANON KABUSHIKI KAISHA, Tokyo (JP)

(72) Inventor: Yasuo Fukuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/836,003

(22) Filed: Jun. 9, 2022

(65) Prior Publication Data
US 2022/0400223 A1   Dec. 15, 2022

(30) Foreign Application Priority Data

Jun. 15, 2021 (JP) .................... 2021-099683

(51) Int. Cl.
*H04N 25/633* (2023.01)
*H04N 25/50* (2023.01)

(52) U.S. Cl.
CPC ........... *H04N 25/633* (2023.01); *H04N 25/50* (2023.01)

(58) Field of Classification Search
CPC .. H04N 5/36963; H04N 5/351; H04N 5/3535; H04N 5/35554; H04N 5/361
USPC ........................................ 348/243
See application file for complete search history.

(56) References Cited

U.S. PATENT DOCUMENTS

| | | | |
|---|---|---|---|
| 6,144,408 A * | 11/2000 | MacLean | H04N 23/125 348/241 |
| 8,265,423 B2 | 9/2012 | Fukuda | |
| 8,441,535 B2 * | 5/2013 | Morin | H04N 25/443 382/104 |
| 8,660,381 B2 | 2/2014 | Fukuda | |

(Continued)

FOREIGN PATENT DOCUMENTS

JP    2010-136205 A    6/2010

OTHER PUBLICATIONS

Extended European Search Report issued in corresponding EP Patent Application No. 22178476.2, dated Oct. 18, 2022.

(Continued)

*Primary Examiner* — Lin Ye
*Assistant Examiner* — Chan T Nguyen
(74) *Attorney, Agent, or Firm* — Carter, DeLuca & Farrell LLP

(57) ABSTRACT

Pixel values are read out of an OB pixel region under a predetermined exposure condition, and predetermined processing is performed on the pixel values to derive a dark current component value. The dark current component value of a segmented pixel region is estimated from the OB dark current component value by taking into account the difference between the exposure conditions of the OB pixel region and the segmented pixel region. Specifically, a conversion ratio for calculating the dark current component value from the OB dark current component value is derived based on the ratios between exposure time and gain in the exposure conditions of the two pixel regions. This conversion ratio is applied to the pixel values of the OB pixel region or the OB dark current component value calculated from them to thereby calculate an estimated dark current component value for the exposure condition of the segmented pixel region.

10 Claims, 7 Drawing Sheets

(56) References Cited

U.S. PATENT DOCUMENTS

| | | | |
|---|---|---|---|
| 2003/0128285 A1* | 7/2003 | Itoh | H04N 25/68 |
| | | | 348/229.1 |
| 2005/0242380 A1 | 11/2005 | Suzuki et al. | |
| 2007/0273785 A1* | 11/2007 | Ogawa | H04N 9/0451 |
| | | | 348/E5.037 |
| 2009/0135295 A1 | 5/2009 | Kunishige et al. | |
| 2009/0225189 A1 | 9/2009 | Morin | |
| 2009/0273785 A1* | 11/2009 | Gundersen | G01N 21/532 |
| | | | 356/437 |
| 2009/0290049 A1* | 11/2009 | Ukita | H04N 25/63 |
| | | | 348/E9.037 |
| 2013/0120619 A1* | 5/2013 | Mo | H04N 25/63 |
| | | | 348/243 |
| 2014/0313378 A1* | 10/2014 | Yuen | H04N 25/677 |
| | | | 348/272 |
| 2015/0116533 A1* | 4/2015 | Hsu | H04N 25/63 |
| | | | 348/223.1 |
| 2017/0187970 A1 | 6/2017 | Zhou et al. | |
| 2020/0357754 A1* | 11/2020 | Toyoshima | H04N 25/63 |

OTHER PUBLICATIONS

European Office Action issued by the European Patent Office on Sep. 16, 2024 in corresponding EP Patent Application No. 22178476.2.

\* cited by examiner

INFORMATION PROCESSING APPARATUS, INFORMATION PROCESSING METHOD, IMAGE SENSOR, AND STORAGE MEDIUM

BACKGROUND OF THE INVENTION

Field of the Invention

The present disclosure relates to a technique for controlling the amount of exposure during image capturing.

Description of the Related Art

Image sensors are energized even in a state of receiving no light, and the current flowing through them in this state is called dark current. If a pixel value is read out of an image sensor in the state of receiving no light, the pixel value indicates a value of a certain degree. This value originating from a dark current is also contained as a part of a pixel value read out in a normal pixel reading operation. Thus, the component originating from the dark current in the read pixel value is also called a dark current component. The dark current component usually raises the pixel values of the entire image. Then, the entire image will appear lighter with this component is not removed. Also, it is known that the value of this dark current component varies according to the exposure condition and the sensor temperature. It is therefore preferable to adaptively detect this dark current component at the time of image capturing and remove the dark current component based on the detection result.

A method has been known in which, in order to detect this dark current component, an optical black (OB) pixel region, which is a light-shielded pixel region, is provided at a peripheral portion of the image sensor and, at the time of image capturing, pixel values are read out of the pixels in the OB pixel region as well as from the pixels in the image capturing region (effective pixel region) and the size or distribution of the dark current component is estimated from the pixel values of the OB pixel region.

In recent years, high-dynamic range (hereinafter referred to as HDR) image capturing has been known as an image capturing method to widen the image capturing dynamic range of image sensors. While there are several methods of performing HDR image capturing, one method known uses an image sensor that has its image capturing region segmented into a plurality of sub regions and can perform image capturing with an exposure condition (exposure time and gain) individually set for each sub region (see Japanese Patent Laid-Open No. 2010-136205). Hereinafter, such an image capturing method will be referred to as "region-specific exposure image capturing", and an image sensor capable of performing the region-specific exposure image capturing will be referred to as "region-specific exposure sensor" for convenience.

A problem with region-specific exposure sensors, however, is that a dark current component value estimated based on pixel values read out under a single exposure condition as in the conventional practice is different from the dark current component value of a region estimated under a different exposure condition. This results in a failure to accurately estimate the dark current component value of each region.

SUMMARY OF THE INVENTION

The technique of the present disclosure provides an information processing apparatus for estimating a dark current component value contained in a pixel value to be output from an image sensor, in which an image capturing surface of the image sensor including a plurality of effective pixel regions and a light-shielded region for which exposure conditions are individually settable, and the information processing apparatus comprises an estimation unit configured to estimate the dark current component value of each of the plurality of effective pixel regions based on a conversion ratio derived from an exposure condition of the light-shielded region and an exposure condition of the effective pixel region.

Further features of the present invention will become apparent from the following description of exemplary embodiments with reference to the attached drawings.

DESCRIPTION OF THE EMBODIMENTS

First Embodiment

Figure 1:
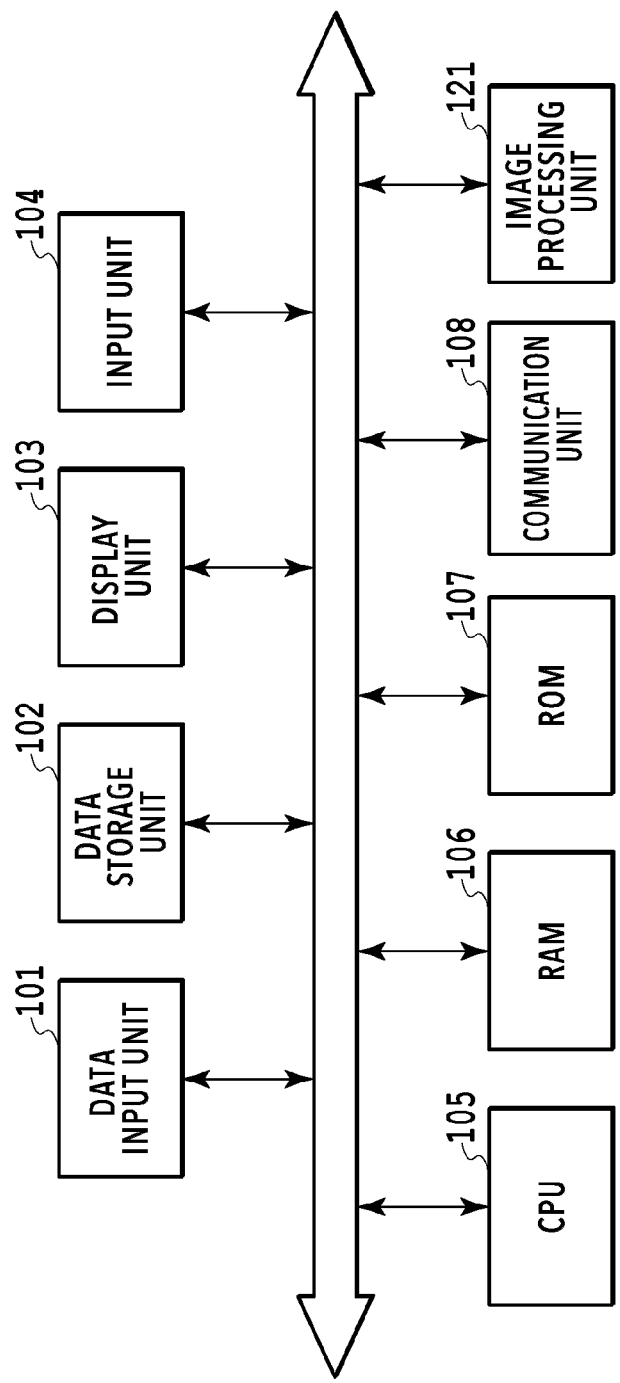
FIG. 1 is a diagram illustrating an example hardware configuration for implementing an information processing apparatus for determining exposure conditions for a plurality of pixel regions according to the technique of the present disclosure.

FIG. 1 is a diagram illustrating an example hardware configuration for implementing an information processing apparatus for determining exposure conditions for a plurality of pixel regions according to the technique of the present disclosure.

In the example configuration illustrated in FIG. 1, an information processing apparatus connected to a data input unit 101 that performs image capturing determines the exposure condition of each of a plurality of pixel regions included in the data input unit 101. In FIG. 1, the information processing apparatus refers to a part including a data storage unit 102, a display unit 103, an input unit 104, a CPU 105, a RAM 106, a ROM 107, a communication unit 108, and an image processing unit 121.

The data input unit 101 includes a conventional image sensor or the like that outputs image data obtained by capturing an image at the image capturing surface of a photoelectric conversion sensor unit having a plurality of photoelectric conversion elements. The data input unit 101 has a plurality of pixel regions at the image capturing surface and is capable of performing image capturing with an independent exposure condition (exposure time (storage time) or shutter speed and gain) individually set for each of the plurality of pixel regions. Simply speaking, the data input unit 101 only needs to be configured to be capable of receiving data designating the exposure condition of each pixel region and individually setting an exposure condition for each pixel region. Herein, for a photoelectric conversion element and a storage capacitor included in each pixel, the exposure time is a storage time for which a signal charge is stored into the storage capacitor from the photoelectric conversion element. Moreover, for the photoelectric conversion element, the storage capacitor, and an amplification unit included in each pixel, the gain is an analog gain indicating the degree of amplification of the amplification unit, which amplifies and outputs the signal charge stored in the storage capacitor from the photoelectric conversion element.

The data designating this exposure condition may be generated by, for example, software that runs on the information processing apparatus with the CPU 105 to be described later. Alternatively, the configuration may be such that the data designating the exposure condition is stored in a specific storage area in the RAM 106 or the like in advance, and the data input unit 101 refers to it.

The data storage unit 102 is a storage device that stores image data, parameters, and the like, and is usually an HDD, SSD, flexible disc, or the like. Alternatively, the data storage unit 102 may be a CD-ROM, CD-R, DVD, Blu-ray (registered trademark), memory card, CompactFlash (CF) card, SmartMedia card, SD card, Memory Stick card, xD-Picture Card, USB memory, or the like. The data storage unit 102 is capable of storaging, in addition to image data, programs that run on the CPU 105 and other data. Alternatively, a part of the RAM 106 to be described later may be used as the data storage unit 102. Still alternatively, the data storage unit 102 may be virtually constructed by utilizing a storage device in an external apparatus connected via the communication unit 108 to be described later.

The display unit 103 is a device that, for example, displays images before and after image processing based on image data output from the data input unit 101 and images of GUIs and the like. Generally, a display using a CRT, a liquid crystal, or organic LEDs or the like is employed. The display unit 103 may be a display device of an external apparatus connected by a cable or the like via an input-output interface.

The input unit 104 is a device that inputs user instructions and data, and includes a keyboard and a pointing device. The pointing device is typically a mouse, a trackball, a trackpad, a tablet, or the like. Alternatively, the input unit 104 may be buttons, a dial, and/or the like in a case of applying the present embodiment to an apparatus such as a conventional digital camera apparatus or printer, for example. Also, the keyboard may be configured by means of software (software keyboard) such that characters can be input by operating buttons, a dial, or the above-mentioned pointing device. Alternatively, the display unit 103 and the input unit 104 may be a single device like a publicly known touchscreen device. In this case, inputs via the touchscreen are handled as inputs from the input unit 104. Also, the input unit 104 may be configured to receive user instructions via conventional gesture recognition processing. In this case, the input unit 104 includes an input device that inputs an image with a visible or infrared ray and a device that recognizes the user's motion from that image and converts it into a command. As for the former device, the data input unit 101 may also serve as the input unit 104. The latter device, which converts the user's motion into a command, may be configured by adding dedicated hardware to the configuration in FIG. 1, or by using software that runs on the CPU 105 to be described later or the like. The motion recognition method may be a publicly known method.

Similarly, the input unit 104 may be configured to obtain user instructions via publicly known speech recognition processing. In this case, the input unit 104 includes a conventional microphone device and a device that recognizes the users speech from speech data and converts it into a command. The device which recognizes the user's speech and converts it into a command may be configured by adding dedicated hardware to the configuration in FIG. 1, or by using software that runs on the CPU 105 or the like. The speech recognition method may be a conventional method.

As for the gesture recognition and the speech recognition, the configuration may be such that the recognition processing is executed outside the apparatus in FIG. 1. In this case, the apparatus in FIG. 1 is configured to be connected to another apparatus or a server on a network via the communication unit 108 and send image data or speech data to that external apparatus or server. The external apparatus or the server may be configured to receive the image data or the speech data and return data representing a recognition result to the apparatus illustrated in FIG. 1 by following a communication procedure.

The CPU 105 is involved in all processing by the components described above. The RAM 106 and the ROM 107 provide the CPU 105 with programs, data, work areas, and the like necessary for the processing to be performed by the CPU 105. Also, in a case where control programs necessary for the processing to be described later are stored in the data storage unit 102 or the ROM 107, they are read into the RAM 106 and then executed by the CPU 105. In a case of receiving a program from an external apparatus via the communication unit 108, the program received by the communication unit 108 is stored in the data storage unit 102 or the RAM 106 and then executed by the CPU 105.

Note that FIG. 1 illustrates a configuration with only one CPU (CPU 105), but a configuration with a plurality of these is also possible.

The communication unit 108 is an interface (I/F) for performing communication with an apparatus(es). The communication method to be used by the communication unit 108 may be a wired communication method using a conventional wired network, RS-232C. USB, IEEE1284, or IEEE1394, or a telephone line, or the like. Alternatively, the method may be a wireless communication method such as an infrared communication method (IrDA), IEEE802.11a, IEEE802.11b. IEEE802.11g, IEEE802.11n, IEEE802.11ac, or IEEE802.11ax. Still alternatively, another wireless communication method such as Bluetooth, Ultra Wide Band (UWB), a wireless telephone line, or Near-Field Communication (NFC).

The image processing unit 121 includes a conventional digital signal processor (DSP), logic circuits, and the like. Alternatively, the image processing unit 121 may be a publicly known graphics processing unit (GPU) or the like. The image processing unit 121 performs arithmetic processing on image data input from the data input unit 101 or image data held in the RAM 106, the data storage unit 102, or the like. The result of the processing by the image processing unit 121 is output to the RAM 106, the data storage unit 102, the display unit 103, and the like or output to an external apparatus via the communication unit 108.

The configuration may be such that the CPU 105 serves as the image processing unit 121 in a case where the amount of arithmetic processing to be performed by the configuration in FIG. 1 is small (a high calculation speed is not required or the number of pieces of data to be calculated is small).

While not illustrated in FIG. 1, conventional register circuits or the like can be added as necessary. Registers are suitable for holding operation parameters of the CPU 105 and the image processing unit 121 and other similar purposes. The registers can be configured such that their values can be set not only by the CPU 105 and the image processing unit 121 but also by an external apparatus via the communication unit 108.

Note that the hardware configuration illustrated in FIG. 1 is a mere example. Not all components are essential, and modifications without some of the components are possible. For example, in a case where the apparatus is constructed as a conventional camera apparatus, it is usually configured such that a preview of an object can be displayed on the display unit 103 and an image captured can be checked on the display unit 103. Here, the apparatus can be configured to display such an image on an apparatus connected via the communication unit 108 (e.g., a conventional smartphone). In this case, the display unit 103 can be omitted. Similarly, the configuration can be such that an input is entered on an apparatus connected via the communication unit 108, a command corresponding to that input is received via the communication unit 108, and an operation is performed in accordance with the received command. The command may be interpreted by the CPU 105 or the image processing unit 121. In this case, the input unit 104 can be omitted too. It is also possible to omit the CPU 105, the ROM 107, and the like in a case where software-based processing and control are not necessary (e.g., a case where all processing is formed as logic circuits and implemented within the image processing unit 121, or the like).

Figure 2:
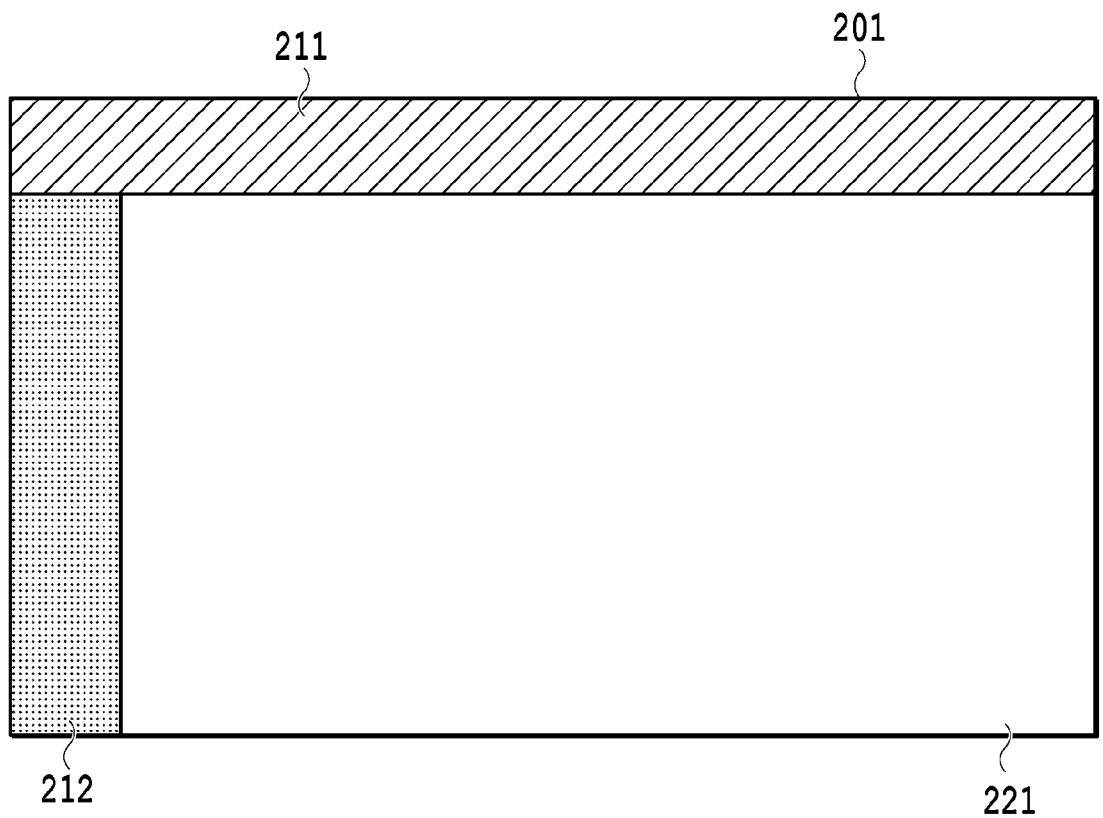
FIG. 2 is a diagram illustrating an example of OB pixel regions and an effective pixel region in a common image sensor.

FIG. 2 is a diagram describing an example of the image sensor used in the present embodiment. The data input unit 101 includes, at its image capturing surface 201, optical black (OB) pixel regions 211 and 212, which are light-shielded regions, and an effective pixel region 221, which is not shielded from light. The OB pixel region 211 is also called a vertical OB region while the OB pixel region 212 is also called a horizontal OB pixel region. Instead of the configuration illustrated in FIG. 2, the image capturing surface 201 may be further segmented to set various pixel regions. Nonetheless, these regions are not the main focus of the present disclosure, and a simple configuration as described above will be assumed below.

Now, the pixel value of every pixel to be obtained from the data input unit 101 contains a dark current component. Thus, for the effective pixel region 221, it is desired to obtain pixel values corresponding to incident light on the image capturing surface 201 but, in reality, the pixel values also contain dark current components. In a case where every pixel value obtained contains a dark current component, the signal value of each pixel that is supposed to be black cannot be the ideal value (e.g., a signal value of 0 or a very small value), and the pixel values of the entirety are raised. Consequently, the image appears lighter.

To address this, pixel values read out of the OB pixel regions 211 and 212 are used to estimate the above dark current component which is subsequently removed from the signal value of each pixel. Note that the pixel value of every pixel read out of the image capturing surface 201 contains a random noise component. For this reason, in the present embodiment, in order to estimate the dark current component, statistical processing is performed on the pixel values read out of the OB pixel regions 211 and 212 to remove the random noise components therein. In order for this statistical processing to achieve desired accuracy, a number of pixel values corresponding to the desired accuracy are required. That is, each OB pixel region is required to have a size corresponding to the desired accuracy. In many cases, the size of the OB pixel regions 211 and 212 is required to be a width of several tens to several hundreds of pixels, for example, though it varies depending on the image sensor's characteristics.

Note that the estimated dark current component value is preferably two-dimensional information obtained for each pixel position within the effective pixel region 221, but may be a single-value one-dimensional information for each exposure condition in a case of simplifying the estimated dark current component value to be applied.

Figure 3:
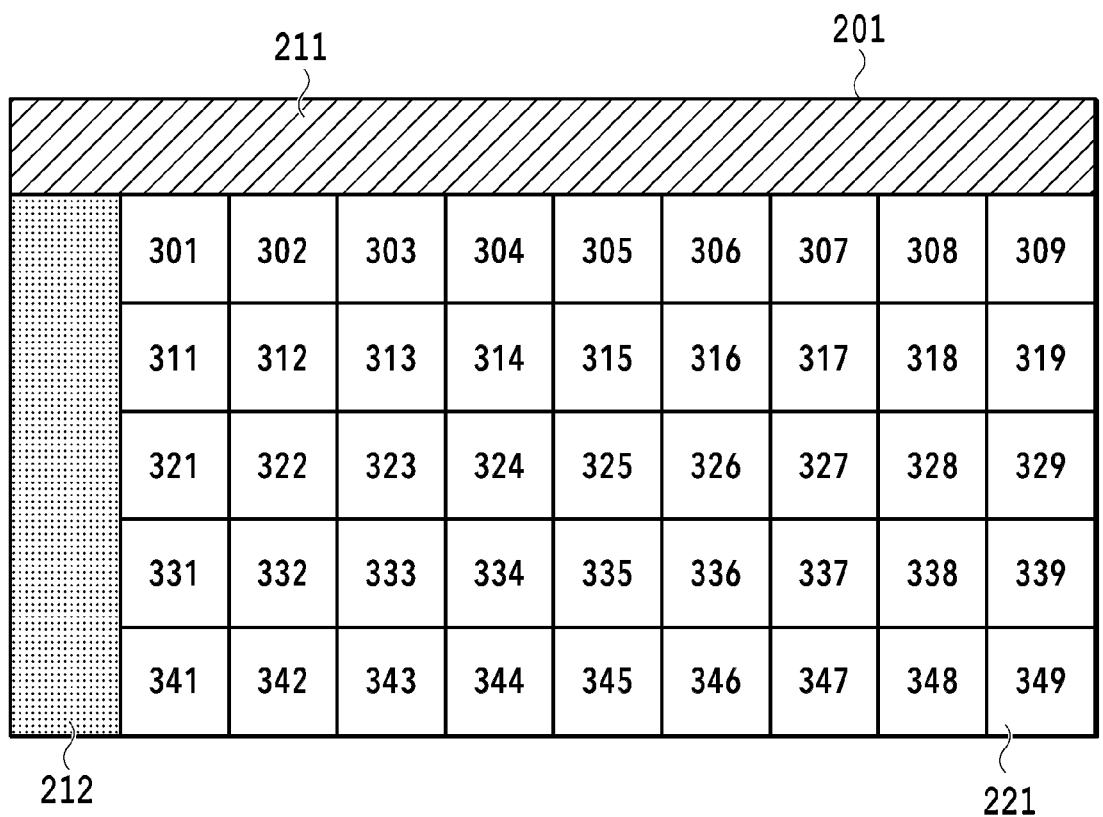
FIG. 3 is a diagram illustrating an example of an image sensor capable of changing an exposure condition on a region-by-region basis.

FIG. 3 is a diagram illustrating the image capturing surface of a sensor capable of performing region-specific exposure. The image capturing surface 201 has the OB pixel regions 211 and 212 and the effective pixel region 221, like the one in FIG. 2. In FIG. 3, the effective pixel region 221 is segmented into 45 segmented pixel regions 301 to 309, 311 to 319, 321 to 329, 331 to 339, and 341 to 349, and an exposure condition (exposure time and gain) can be individually set for each segmented pixel region. Hereinafter, the 45 segmented pixel regions 301 to 309, 311 to 319, 321 to 329, 331 to 339, and 341 to 349 will also be referred to as the segmented pixel regions 301 to 349. Since this sensor capable of performing region-specific exposure can independently set an exposure condition for each of the 45 segmented pixel regions 301 to 349, the sensor can be exposed under a maximum of 45 exposure conditions in a single image capturing operation.

Now, an example of the exposure amount control by the sensor capable of performing region-specific exposure illustrated in FIG. 3 will be described. The configuration is such that, for example, the image processing unit 121 processes image data obtained from the data input unit 101. At the image processing unit 121, for each of the segmented pixel regions 301 to 349 illustrated in FIG. 3, the pixel values of the pixels included in the segmented pixel region are collected, and information indicating the brightness of the region (hereinafter referred to as "region brightness information") is calculated. This region brightness information is generated by the image processing unit 121 and output to the RAM 106 for each segmented pixel region.

There are various possible options for the region brightness information. Among these, the average or a histogram of the pixel values in the region may be used, for example. In a case where the data input unit 101 is a color sensor, signals from a plurality of channels may be converted into a one signal (e.g., luminance information or the like) and collected, and region brightness information may be created with it. As the conversion is into one signal, weighted averaging or the like may be used in which each channel is weighted. Alternatively, the configuration may be such that values collected from each channel are used for the region brightness information, in which case the average or a histogram of the pixel values of the pixels in the region from each channel may be used.

Next, based on the region brightness information, the exposure condition of each of the segmented pixel regions 301 to 349 is determined. The exposure condition may be determined using a conventional program diagram, for example. The exposure condition of each of the segmented pixel regions 301 to 349 is determined based on the exposure time (shutter speed) of the segmented pixel region and the gain (ISO sensitivity) of each pixel included in the segmented pixel region. In the case of using a program diagram, an exposure value (EV) is determined from the region brightness information, and the exposure condition is determined by following the program diagram based on the EV for each region thus determined and exposure condition information associated with image capturing performed using the data input unit 101. This processing is performed for each segmented pixel region to determine the exposure condition of each segmented pixel region.

The above exposure condition determination processing can be implemented with a program that runs on the CPU 105, for example. Alternatively, the processing can be implemented by forming logic circuits equivalent to the program and causing the image processing unit 121 to use them.

Next, dark current component removal processing for a sensor capable of performing region-specific exposure as illustrated in FIG. 3 will be described.

As mentioned earlier, estimating a dark current component requires OB pixel regions with a size corresponding to desired estimation accuracy. Here, the dark current component varies depending on the exposure condition. Thus, in the case of a sensor capable of performing region-specific exposure as illustrated in FIG. 3, it is necessary to prepare OB pixel regions with a size 45 times larger than the OB pixel regions 211 and 212 or to perform an image capturing operation 45 times while changing the exposure condition of the OB pixel regions 211 and 212.

In the former case, the OB pixel regions 211 and 212 are so large that the ratio of the effective pixel region 221 in the image capturing surface 201 is relatively smaller, which is not preferable for a sensor. In the latter case, the OB pixel regions 211 and 212 can have conventional sizes (as exemplarily illustrated in FIG. 2) but have to undergo an exposure operation 45 times, which makes long-time exposure difficult. Moreover, it is necessary to hold pieces of OB pixel data obtained by the 45 exposure operations or estimated dark current component values calculated therefrom, which requires an additional component such as a memory. Therefore, the latter case is not preferable either.

For the above reasons, in the present disclosure, pixel values are read out of the OB pixel regions 211 and 212 under a predetermined exposure condition, and predetermined processing is performed on the read pixel values to derive a dark current component value. Thereafter, the dark current component value of each of the segmented pixel regions 301 to 349 is estimated from the OB dark current component value by taking into account the difference between the exposure condition of the OB pixel regions 211 and 212 and the exposure condition of the segmented pixel region, i.e., the difference in exposure time and gain.

A plurality of OB dark current component values may be derived for a small number of different exposure conditions. Also, the exposure condition of the OB pixel regions 211 and 212 preferably has a longer exposure time and a higher gain than those of the exposure conditions of the segmented pixel regions 301 to 349.

A dark current component is considered to be proportional to the exposure time and gain in the exposure condition. Thus, a conversion ratio for calculating the dark current component value of each of the segmented pixel regions 301 to 349 from the OB dark current component value is derived based on the exposure time ratio and gain ratio between the exposure condition of the OB pixel regions 211 and 212 and the exposure condition of each of the segmented pixel regions 301 to 349. Thereafter, this conversion ratio is applied to the pixel values of the OB pixel regions 211 and 212 or to the OB dark current component value calculated from the pixel values of the OB pixel regions 211 and 212 to thereby calculate an estimated dark current component value for the exposure condition of each of the segmented pixel regions 301 to 349.

Note that the pixel values read out of the OB pixel regions 211 and 212 also contain random noise components and the like. Hence, the conversion ratio derived based on the difference in exposure condition is preferably applied to the OB dark current component value, which is obtained by performing statistical processing (e.g. processing of calculating the average, a weighted average, or the median) on the pixel values of the OB pixel regions 211 and 212.

For the above reasons, a conversion ratio Rconv(i) for the i-th block region is derived by the equation below.

$$Rconv(i) = Rtime(i) \times Rgain(i) = \frac{\text{Exp}Tblock(i)}{\text{Exp}Tob} \times \frac{\text{Exp}Gblock(i)}{\text{Exp}Gob} \quad \text{Equation (1)}$$

The parameters used in Equation (1) are defined as below.

Rtime(i): Ratio between the exposure time of the i-th block region and the exposure time of the OB pixel regions Rgain(i). Ratio between the gain of the i-th block region and the gain of the OB pixel regions ExpTob: Exposure time of the OB pixel regions ExpGob: Gain used to read out pixel values from the OB pixel regions ExpTblock(i): Exposure time of the i-th block region ExpGblock(i): Gain used to read out pixel values from the i-th block region An estimated value of the dark current component for the exposure condition of each of the segmented pixel regions 301 to 349 is calculated by multiplying the OB dark current component value, calculated by performing the statistical processing on the pixel values of the OB pixel regions 211 and 212, by Rconv(i). Thus, a configuration with which the value of Rconv(i) is 1 or less is preferable since the error in the estimated value is expected to be small in this way. Thus, the exposure condition to be applied to the OB pixel regions 211 and 212 is preferably set to be equivalent to or greater than the greatest exposure condition among the exposure conditions of the segmented pixel regions 301 to 349. The greatest exposure condition refers to the exposure condition among the exposure conditions of the segmented pixel regions 301 to 349 which has the longest exposure time and the highest gain or has the greatest total value converted by an equation provided by a conventional Additive System of Photographic Exposure (APEX) system.

This processing of estimating the dark current component in each pixel region differing in exposure condition can be implemented with a program that runs on the CPU 105, for example. Alternatively, the processing can be implemented by forming logic circuits equivalent to the program and causing the image processing unit 121 to use them.

The dark current component value of the i-th segmented pixel region can be removed by subtracting the estimated dark current component value calculated by multiplying the OB dark current component value, which is calculated from the pixel values of the OB pixel regions 211 and 212, by Rconv(i), which is derived according to the exposure condition of that segmented pixel region. This processing of removing the dark current component value can be implemented by the image processing unit 121 or the like in the configuration of FIG. 1, for example.

Next, characteristics of a dark current component will be considered. As mentioned earlier, a dark current component is proportional to the exposure time and the readout gain, but is also temperature dependent. However, a dark current component is not proportional to the temperature but increases exponentially with a temperature rise. It has been found that a dark current component doubles as the temperature rises by 8 degrees Celsius, and this model can be represented by the equation below.

$$d(k) = d_0 \times 2^{\frac{k-k_0}{8}} \quad \text{Equation (2)}$$

Figure 4:
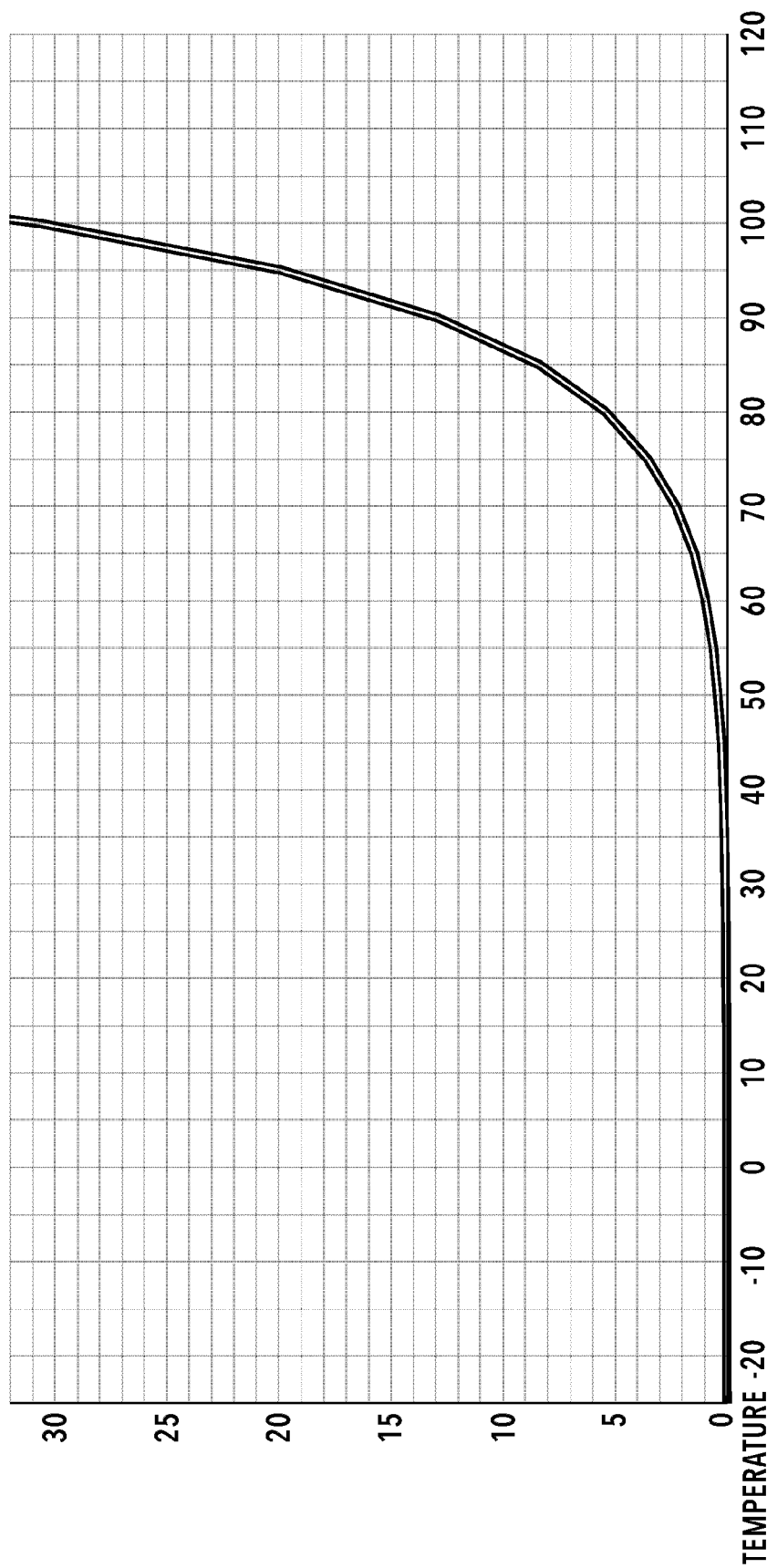
FIG. 4 is a diagram illustrating a temperature characteristic of a dark current component in an image sensor based on a model.

The parameters used in Equation (2) are defined as below.
d(k): Dark current component value at a temperature k
$k_0$: Reference temperature
$d_0$: Dark current component value at the temperature $k_0$ FIG. 4 is a graph plotting dark current component values at temperatures of about −20° C. to 100° C. in a case where the reference temperature $k_0$ in the above model is 60° C. and the dark current component value do in this state is at a level of 1 ($k_0$=60, $d_0$=1). As illustrated in FIG. 4, in a range above the reference temperature $k_0$, the dark current component value increases abruptly.

Incidentally, the model described above contains an error. For example, there are a case where there is an error between the actually measured value and the design value of each gain in dark current component conversion corresponding to an exposure condition as described in Equation (1), and other similar cases.

Suppose a case where the temperature of the sensor is a predetermined temperature or less and is sufficiently low, and the pixel values of the OB pixel regions 211 and 212 exposed under the greatest exposure condition are at a sufficiently low level. In this case, even if the estimated value of the dark current component contains an error, the value is, for example, below the level of 1 and is small enough to ignore. However, as illustrated in FIG. 4, this error may be too large to ignore in a case where the temperature of the sensor is high. If the error is large and an image is captured with a different exposure condition set for each region in the sensor capable of performing region-specific exposure illustrated in FIG. 3, an image quality problem occurs at the boundary between regions (a step between blocks) due to the error in the estimated value of the dark current component mentioned above.

To address this, in the present disclosure, an upper limit value of the exposure condition that can be applied is changed according to the temperature of the sensor to thereby set a constraint on the exposure amount control during a high-temperature state.

Figure 5:
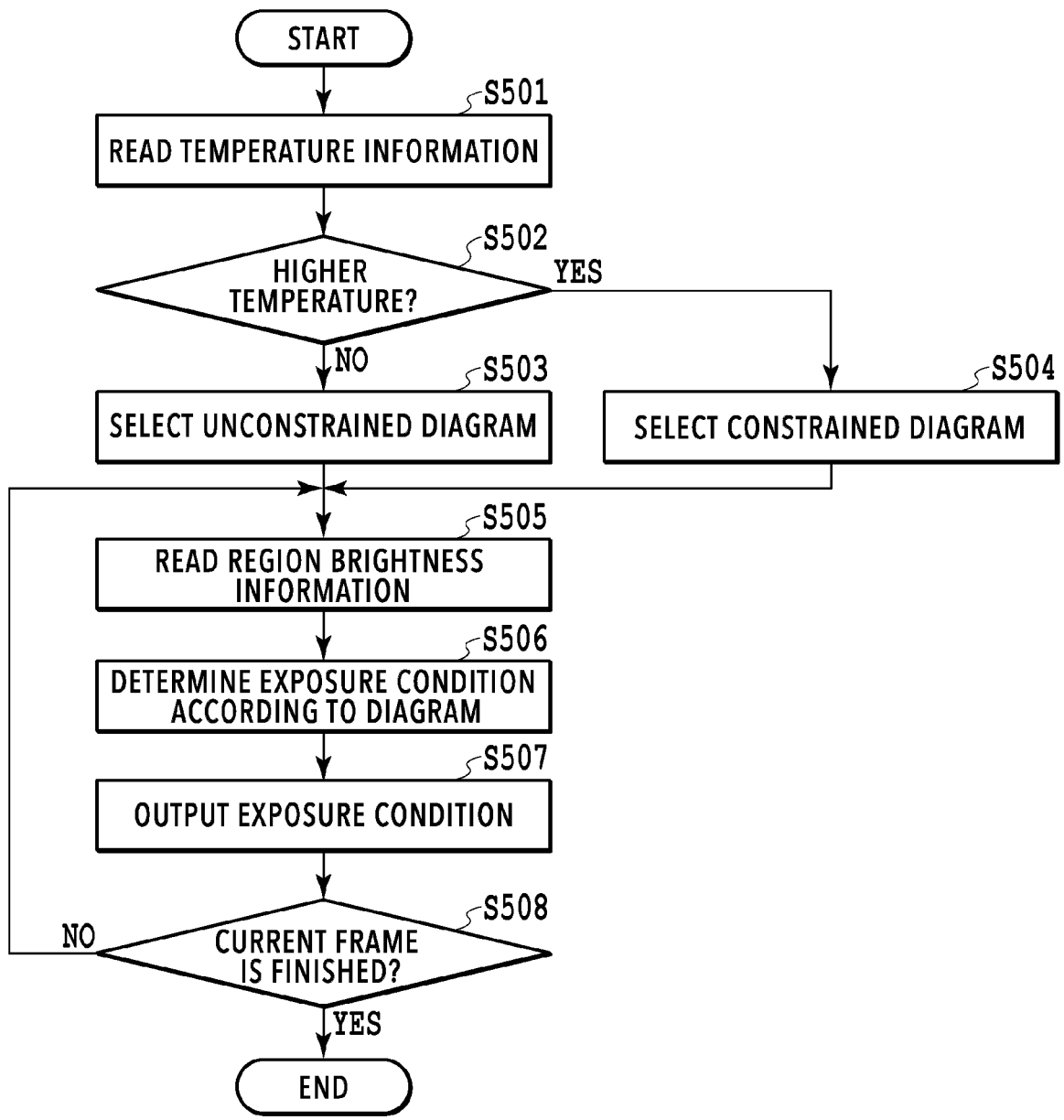
FIG. 5 is a flowchart illustrating a flow of exposure condition determination processing according to a first embodiment.

FIG. 5 is a flowchart illustrating an example of the processing of determining an exposure condition for each segmented pixel region according to the present embodiment. The following description will be given on the assumption that the CPU 105 processes the process flow illustrated in FIG. 5. Nonetheless, modifications such as the image processing unit 121 executing the process flow can be easily implemented, as mentioned earlier.

In S501, the CPU 105 reads temperature information on the image sensor. The temperature information only needs to be held in a storage device such as the RAM 106 or a register not illustrated in FIG. 1, for example. In this case, the configuration is such that the CPU 105 accesses the RAM 106 or the register and reads the temperature information. The temperature information to be used here may be any numerical value as long as it has a high correlation with the temperature. For example, the temperature may be numerical (integer or floating point number form) data or the reading of a conventional temperature sensor or the like.

The temperature information held in the RAM 106 or the register may be a measurement result such as the reading of a temperature sensor that measures the temperature of the image capturing surface 201, which may be optionally added to the configuration in FIG. 1, or obtained from an external apparatus connected via the communication unit 108 illustrated in FIG. 1. Alternatively, the temperature information can be generated from a statistic of pixel values read out of the OB pixel regions 211 and 212. In this case, for the generation of the temperature information, the configuration can be such that image data is obtained from the data input unit 101 and processed by the image processing unit 121. The image processing unit 121 may calculate the statistic of the pixel values of the entirety or a part of the OB pixel regions 211 and 212 and hold that statistic in the RAM 106 or the register.

The statistic may simply be the average, a weighted average, or the like of the pixel values of the OB pixel regions 211 and 212. Instead of this, another statistic may be employed as long as it is a representative value of the pixels in the OB pixel regions 211 and 212, e.g., the mode or the like.

Also, in a case where the data input unit 101 is a color image sensor and includes pixels of a plurality of channels, the configuration may be such that a statistic is calculated from the entire OB pixel regions 211 and 212 without the channels taken into consideration. Conversely, a statistic of the pixel values of the OB pixel regions 211 and 212 may be calculated on a channel-by-channel basis.

Also, the criteria for pixel value classification are not necessarily limited to channels. For example, in a case where a plurality of A/D circuits are present in the data input unit 101 and the A/D circuits vary in characteristics, a statistic may be calculated for each channel and additionally for each A/D circuit. Moreover, in a case where there are a plurality of types of pixel layouts, such as in a case of floating diffusion (FD) sharing between pixels, for example, statistics may be calculated with the pixel layout symmetry taken into account.

Note that the pixel values of the OB pixel regions 211 and 212 may contain a fixed pattern noise. It is therefore preferable to include processing of removing the fixed pattern noise as preprocessing for the above statistic calculation. The method of removing the fixed pattern noise to be used may be a conventional method.

The description now returns to the flowchart in FIG. 5.

In S502, the CPU 105 determines, based on the temperature information read in S501, whether the temperature of the image capturing surface 201 is higher than a predetermined temperature. This determination can be made by, for example, preparing a threshold value in advance and comparing this threshold value and the temperature information. If it is determined that the temperature of the image capturing surface 201 is higher, the processing proceeds to S504. If it is determined that the temperature of the image capturing surface 201 is not higher, the processing proceeds to S503.

In S503 and S504, a program diagram for determining the exposure conditions to be used in subsequent processing is selected.

In the present embodiment, in S505 to S507 following S503 or S504, the exposure condition of each segmented pixel region in the current frame is determined by using a program diagram, as mentioned earlier, with reference to the exposure condition of and the region brightness information on the corresponding region in a previous frame(s). In the present embodiment, as least two program diagrams are prepared. One is a normal program diagram for determining the most appropriate exposure condition among all exposure conditions that can be used with the image sensor (referred to also as "unconstrained program diagram"). Another one is a program diagram for determining the most appropriate exposure condition among exposure conditions with an upper limit value set lower than that of an exposure condition that can be used with the image sensor (referred to also as "constrained program diagram"). By setting the upper limit value of exposure conditions lower, the exposure condition with the highest gain (e.g., 8 or 16) among the selectable exposure conditions in the unconstrained program diagram is rendered unselectable. The above two program diagrams are stored in the RAM 106 or the ROM 107, and the CPU 105 refers to one in a case of determining the exposure condition by means of software, and the image processing unit 121 refers to one in a case of determining the exposure condition by means of logic circuits. In the present embodiment, the configuration is such that the CPU 105 determines the exposure condition.

The CPU 105 selects the unconstrained program diagram in S503 and selects the constrained program diagram in S504. The program diagram selection can be implemented by, for example, providing a switch variable, a register not illustrated in FIG. 1, or the like indicating which program diagram to enable, and switching its value according to the result of the determination in S502. The configuration is such that the process in S506 to be described later is performed with an appropriate program diagram selected by referring to the switch variable.

In S505 to S507 following S503 or S504, the CPU 105 determines the exposure condition of one of the segmented pixel regions 301 to 349. The exposure condition determination processing may be performed as already described.

In S505, the CPU 105 reads the region brightness information from the RAM 106 or the like.

In S506, the CPU 105 determines the exposure condition of the region of interest by following the program diagram selected in S503 or S504 on the basis of the read region brightness information on the region.

In S507, the CPU 105 outputs the exposure condition of the region of interest thus determined. In the present embodiment, the configuration is such that the exposure condition of each region is sequentially output to the data input unit 101. A different configuration may be employed in which pieces of data each indicating the exposure condition of one segmented pixel region are temporarily stored in the RAM 106 or the like, and output to the data input unit 101 in a case where the exposure conditions of all regions are prepared.

In S508, the CPU 105 determines whether the processes in S505 to S507 have been done for all regions in the current frame. This determination can be made by counting the number of segmented regions, i.e., the number of times to execute S505 to S507. Thus, a counter variable or the like is provided. The counter may be configured to be reset to 0 in the processing before S505, incremented by one after an exposure condition is output in S507, and compare the number of counts and the number of segmented pixel regions in S508.

If determining in S508 that the processes have been done for all regions, the processing illustrated in the flowchart in FIG. 5 is terminated. If determining that the processes have not been done for all regions in the current frame, the processing returns to S505.

The flowchart exemplarily illustrated in FIG. 5 is based on a configuration in which the processes in S501 to S508 are performed each time an image is captured. However, the configuration may be such that the diagram switching process in S501 to S504 is performed once for a predetermined number of frames, for example. This is based on the idea that an object changes only to a small extent over several frames, and the exposure condition of and the region brightness information on the corresponding region(s) in a previous frame(s) change only to a small extent as well.

In the present embodiment, an example has been shown in which, as illustrated in FIG. 3, the image capturing surface 201 is segmented into the OB pixel regions 211 and 212 and the segmented pixel regions 301 to 349 having the same rectangular shape. However, in the technique of the present disclosure, the shapes of the segmented pixel regions are not limited to this shape. For example, a configuration using segmented pixel regions with different sizes and/or shapes may be employed, such as small blocks at a center portion of the sensor and large blocks at peripheral portions.

Also, in the present embodiment, a configuration is employed, as a preferred example, in which the program diagram is switched between two program diagrams based on the temperature of the image capturing surface 201. A different configuration may be employed in which firstly an exposure condition is temporarily determined from one program diagram and, then, if the temperature of the image capturing surface 201 is high and the gain selected for the temporarily determined exposure condition is higher than a predetermined gain, the exposure condition is changed to one with a gain less than or equal to the predetermined gain.

Moreover, in the present embodiment, an example in which the program diagram is switched between two program diagrams based on one threshold value for the temperature information is described, but a plurality of threshold values may be provided and the program diagram may be switched among three or more program diagrams.

As described above, according to the present disclosure, by following the process flow exemplarily illustrated in FIG. 5, the temperature of the image sensor is estimated and, if the temperature is higher than a predetermined temperature, the upper limit value of the gain in the settable exposure conditions is limited to a value lower than the upper limit value in a state where the temperature is less than or equal to the predetermined temperature. In this way, a system using an image sensor capable of performing region-specific exposure control can inhibit image degradation in a high-temperature state.

Also, a constrained program diagram that limits the gain within any predetermined range may be used. The larger the numerical value of the gain to be used is, the more errors are introduced. Thus, limiting the gain to be used can inhibit image degradation in a high-temperature state.

It is more preferable that the gain in the exposure condition to be set for each of the segmented pixel regions 301 to 349 be limited to a value close to the gain used for the OB pixel regions 211 and 212. This is because the larger the conversion ratio with the exposure condition applied to the OB pixel regions 211 and 212, the larger the error in the estimated dark current component value. In particular, it is preferable that the gain in the exposure condition of a segmented pixel region be set to be equal to the gain applied to the OB pixel regions 211 and 212 since in this way there will be no error in the estimated dark current component value due to the error between the actually measured value and the design value of the gain.

Also, in the present embodiment, a configuration in which the upper limit value of the gain in the settable exposure conditions is lowered in a high-temperature state has been described. However, the upper limit value of the exposure time in the settable exposure conditions may be lowered in a high-temperature state. Specifically, in the case where the temperature is higher than a predetermined temperature, the upper limit value of the exposure time in the settable exposure conditions may be limited to a value lower than the upper limit value in a state where the temperature is less than or equal to the predetermined temperature. With this configuration too, a system using an image sensor capable of performing region-specific exposure control can inhibit image degradation in a high-temperature state.

Second Embodiment

In the present embodiment, only the difference from the first embodiment will be described.

Figure 6:
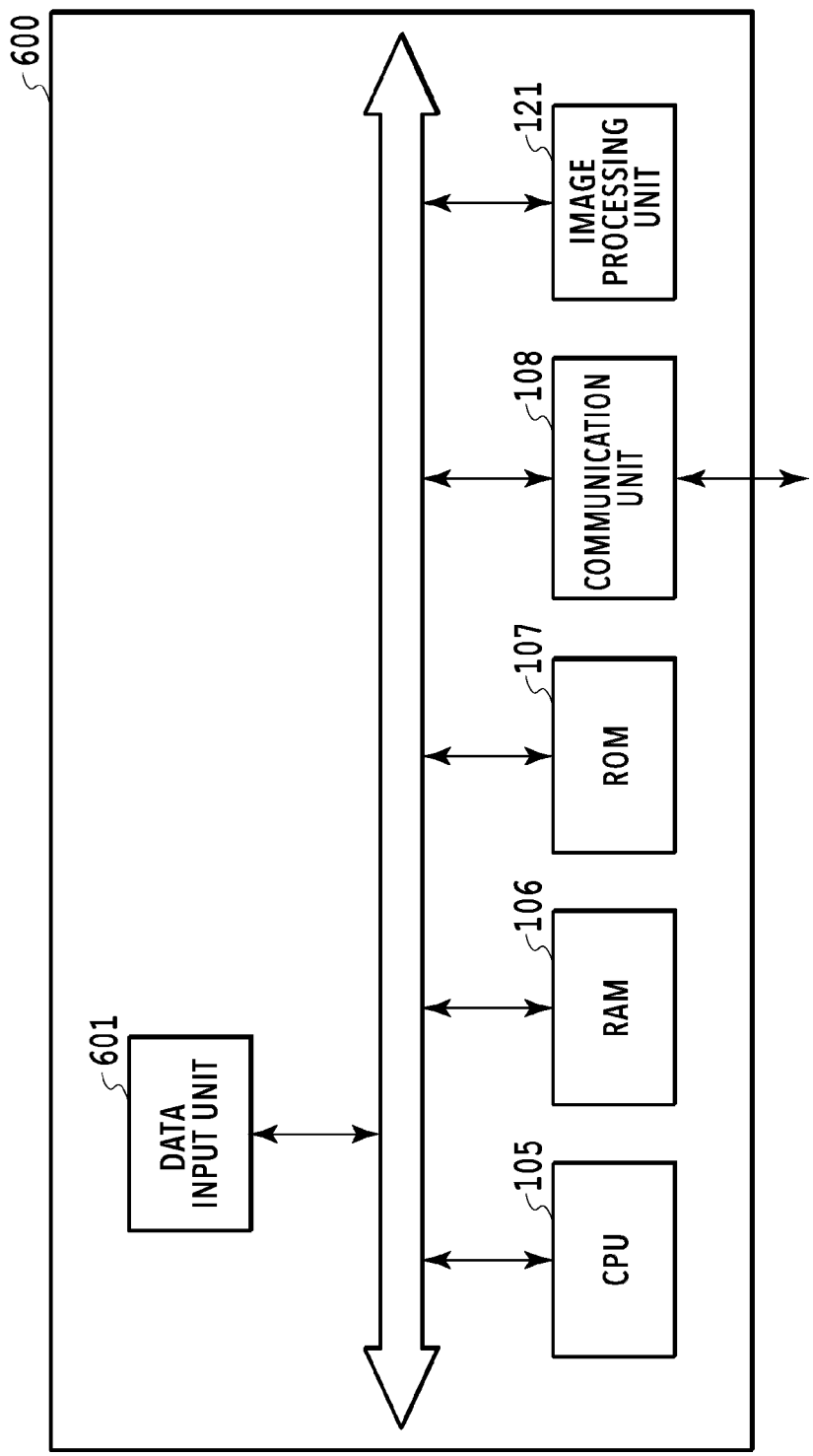
FIG. 6 is a diagram illustrating an example configuration of an image sensor employing an image processing method of the present disclosure.

FIG. 6 is a diagram illustrating an example where an exposure condition determination method or circuit of the present disclosure therein is employed within an image sensor. Note that the same components in FIG. 6 as those in FIG. 1 are denoted by the same reference numerals as those in FIG. 1, and description thereof is omitted.

Reference numeral 600 in FIG. 6 represents the entirety of the image sensor as an apparatus. FIG. 6 illustrates an example where the image sensor 600 includes therein substantially the same components as those described in the first embodiment and FIG. 1. However, a data input unit 601 in FIG. 6 is one including conventional photodiodes and a component that performs processing of reading out data from those photodiodes and performing A/D conversion on the data and, like the data input unit 101, has an image capturing surface 201 as illustrated in FIG. 3. Like the data input unit 101 in the first embodiment, the data input unit 601 is capable of reading a pixel value out of each pixel in the image capturing surface and outputting the pixel value to a RAM 106, an image processing unit 121, or a communication unit 108. The data input unit 601 is also configured to be capable of performing image capturing under a different exposure condition for each segmented pixel region, receiving data designating the exposure condition of each segmented pixel region and of the OB pixel regions, and setting the exposure condition of each pixel region.

In many cases, there is not much need for the sensor itself to be provided with user I/Fs. Thus, the display unit 103 and the input unit 104 illustrated in FIG. 1 are omitted in the example configuration illustrated in FIG. 6. Similarly, in many cases, there is not much need for the sensor itself to have the data storage unit 102. Thus, the data storage unit 102 illustrated in FIG. 1 is also omitted in the configuration illustrated in FIG. 6. In this case, the pixel values read out by the data input unit 601 may be directly saved to the RAM 106 or transmitted to and processed by the image processing unit 121 and then saved to the RAM 106. Moreover, the pixel values read out by the data input unit 601 may be transferred externally via the communication unit 108.

Though not illustrated in FIG. 6, the image sensor 600 may be provided with the data storage unit 102, the display unit 103, and the input unit 104 or the like as necessary, as with the first embodiment.

Also, the communication unit 108 may be an I/F as exemplarily described in the first embodiment but may be another conventional I/F such as the High-Speed Serial Interface, PCI Express, MIPI, or SLVS.

As is obvious from the present embodiment, the technique of the present disclosure is also applicable to a sensor device. The configuration according to the present embodiment is preferably implemented with a conventional stacked sensor or the like.

Third Embodiment

In the present embodiment, only the difference from the first and second embodiments will be described.

As mentioned in the first embodiment, the value of a dark current component usually varies depending on the position on the image capturing surface. More specifically, a dark current component tends to be larger the closer it is to the upper, lower, left, or right edge of the image capturing surface.

For this reason, in the description of the first embodiment and FIG. 5, the program diagram to be used to determine the exposure condition is switched according to the determination in S502 as to whether the temperature is higher. In the present embodiment, in addition to this, the program diagram is switched according to the position of the pixel region.

Figure 7:
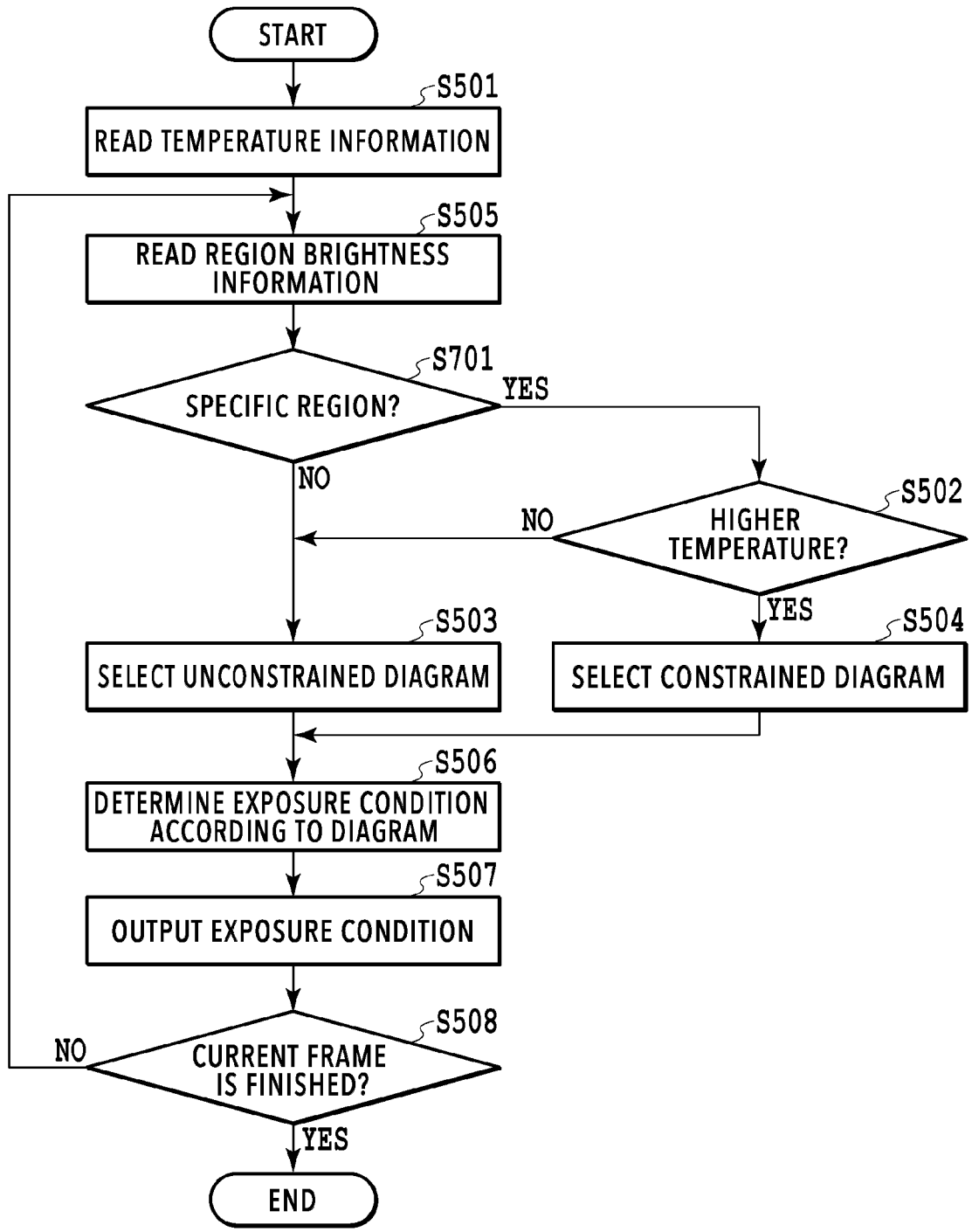
FIG. 7 is a flowchart illustrating a flow of exposure condition determination processing according to a third embodiment.

FIG. 7 is a flowchart illustrating an example of the processing of determining an exposure condition for each segmented pixel region according to the third embodiment. The same processes in FIG. 7 as those in FIG. 5 are denoted by the same reference numerals as those in FIG. 5, and description thereof is omitted.

In the present embodiment, firstly in S701, it is determined for each segmented pixel region whether it is a predetermined specific region. Then in S502, it is determined whether the temperature is higher than a predetermined temperature. In the present embodiment, "specific region" refers to a region at a peripheral portion of an effective pixel region 221, i.e., any one of the segmented pixel regions 301 to 309, 311, 319, 321, 329, 331, 339, and 341 to 349 in FIG. 3. These segmented pixel regions can be easily identified from the order of processing of the segmented pixel regions or the like.

In the present embodiment, in order to determine the exposure condition, the constrained program diagram is used if it can be determined that the segmented pixel region of interest is a specific region (a peripheral portion of the effective pixel region) and the temperature is higher than the predetermined temperature. Otherwise, the unconstrained program diagram is used.

Note that the edge portions of the effective pixel region 221 are used as the specific regions for an illustrative purpose. The principle of the present embodiment is to switch the program diagram for determining the exposure condition according to the position of the segmented pixel region and the temperature.

For example, in a case where the sensor is a so-called stacked image sensor including a pixel substrate and a circuit substrate, the temperature on the image capturing surface may become uneven due to the temperature distribution on the circuit substrate side. As mentioned earlier, the higher the temperature, the larger the dark current. Hence, the configuration can be such that a segmented pixel region close to a high-temperature region on the circuit substrate side is determined as a specific region.

The method according to the present embodiment is a preferable method in cases where the dark current component is dependent on the spatial position. In the present embodiment, for each segmented pixel region at a position where the dark current component is relatively large, the exposure condition is constrained, thereby keeping the dark current component value low. For each segmented pixel region at a position where the dark current component is relatively small, the exposure condition has a certain degree of freedom. Thus, it is possible to achieve both inhibition of image degradation and ensuring of a certain degree of freedom in exposure condition.

Fourth Embodiment

In the present embodiment, only the difference from the first to third embodiments will be described.

In the third embodiment, a case where the program diagram is determined according to the position of the segmented pixel region in addition to the temperature has been shown. A description will be given of examples of making a determination by using another condition.

For example, the lower the object illuminance, the lower the S/N of the image, and therefore the larger an estimated error of the dark current component and the larger the image quality degradation as well. In the present embodiment, focusing on this fact, the program diagram is switched based on the object illuminance. Specifically, the configuration is such that, in a case where the object illuminance is a specific threshold value or less, the constrained program diagram, with which the upper limit value of the exposure condition is set lower, is used as the program diagram for determining the exposure condition. The object illuminance to be used may be a value calculated from pixel values read out of the pixels of an effective pixel region 221 or the reading of an external illuminance sensor.

Also, the image processing unit 121 may apply a digital gain or gamma correction to the read pixel values. In this case, the larger the value of the digital gain or the correction amount of the gamma correction, the greater the image quality degradation due to the estimated error of the dark current. To address this, the configuration may be such that the program diagram for determining the exposure condition is switched based on the digital gain or gamma curve to be used. Specifically, the configuration may be such that the exposure condition is constrained in a case where the digital gain is a predetermined threshold value or more or in a case where the correction amount of the gamma correction is a predetermined threshold value or more.

Moreover, the configuration may be such that the program diagram is switched based on the length of a reference exposure time determined from the exposure times of the segmented pixel regions 301 to 349 in the effective pixel region 221. As mentioned earlier, the value of a dark current component usually varies depending on the position on the image capturing surface 201, and the dark current component tends to be larger the closer it is to the upper, lower, left, or right edge of the image capturing surface 201. Moreover, the longer the exposure time, the larger the dark current component at an edge portion of the image capturing surface 201 than at a center portion of the image capturing surface 201. Accordingly, the longer the exposure time, the greater the image quality degradation particularly at an edge portion of the image capturing surface 201 due to the estimated error of the dark current. Thus, the configuration is such that the gain to be used is constrained in a case where the reference exposure time determined from the exposure times of the segmented pixel regions 301 to 349 is longer than a specific threshold value.

The reference exposure time may be determined from the exposure times individually set for the respective segmented pixel regions in the effective pixel region 221. For example, the reference exposure time may be the longest time among the exposure times for the segmented pixel regions, or the average or the mode of the exposure times. Alternatively, a weight may be set for each region in advance, and a weighted average of the exposure times may be calculated with the respective weights.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure can accurately estimate dark current components in an image sensor. This estimation can then used to modify an image, or an image portion, to improve the image quality. For example, the estimated dark current components may be subtracted from an associated pixel value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-099683, filed Jun. 15, 2021, which is hereby incorporated by reference wherein in its entirety.

What is claimed is:

1. An information processing apparatus for estimating dark current component values contained in pixel values to be output from an image sensor, wherein an image capturing surface of the image sensor including a plurality of effective pixel regions and a light-shielded region for which exposure conditions are individually settable, and the information processing apparatus comprises:
at least one circuit configured to function as:
a restriction unit configured to restrict setting of a second exposure condition which is used for capturing of one of the plurality of effective pixel regions and a third exposure condition which is used for capturing of an other of the plurality of effective pixel regions so that the second exposure condition and the third exposure condition become close to a first exposure condition which is used for obtaining a dark current component from the light-shielded region in a case that a temperature of the image sensor is higher than a predetermined temperature; and
an estimation unit configured to estimate one of the dark current component values contained in the pixel value which is output from one of the plurality of effective pixel regions by capturing with the second exposure condition, based on a conversion ratio of the first exposure condition to the second exposure condition, and
to estimate an other of the dark current component values contained in the pixel value which is output from the other of the plurality of effective pixel regions by capturing with the third exposure condition which is different from the first exposure condition, based on a conversion ratio of the first exposure condition to the third exposure condition.

2. The information processing apparatus according to claim 1, wherein the estimation unit is configured to derive the dark current component value of each of the plurality of effective pixel regions by multiplying a dark current component value derived based on a pixel value read out of the light-shielded region by the conversion ratio.

3. The information processing apparatus according to claim 1, wherein the first exposure condition includes a first exposure time of the light-shielded region and a first gain of the light-shielded region, and the second exposure condition includes a second exposure time of the effective pixel region and a second gain of the effective pixel region.

4. The information processing apparatus according to claim 3, wherein for a photoelectric conversion element and a storage capacitor included in each of pixels in the image sensor, each of the first exposure time and the second exposure time is a storage time for which a signal charge is stored into the storage capacitor from the photoelectric conversion element.

5. The information processing apparatus according to claim 3, wherein for a photoelectric conversion element, a storage capacitor, and an amplification unit included in each of pixels in the image sensor, each of the first gain and the second gain is an analog gain indicating a degree of amplification of the amplification unit, which amplifies and outputs a signal charge stored in the storage capacitor from the photoelectric conversion element.

6. The information processing apparatus according to claim 3, wherein the conversion ratio is a product of an exposure time ratio and a gain ratio, the exposure time ratio being a ratio between the first exposure time of the light-shielded region and the second exposure time of the effective pixel region, the gain ratio being a ratio between the first gain of the light-shielded region and the second gain of the effective pixel region.

7. The information processing apparatus according to claim 1, further comprising at least one circuit configured to function as a setting unit configured to individually set the exposure conditions of the plurality of effective pixel regions and the light-shielded region, wherein
the setting unit is configured to set the exposure condition of the light-shielded region and the exposure condition of each of the plurality of effective pixel regions such that the conversion ratio is 1 or less.

8. An information processing method of estimating dark current component values contained in pixel values to be output from an image sensor, wherein
an image capturing surface of the image sensor includes a plurality of effective pixel regions and a light-shielded region for which exposure conditions are individually settable, and
the information processing method comprises:
restricting setting of a second exposure condition which is used for capturing of one of the plurality of effective pixel regions and a third exposure condition which is used for capturing of an other of the plurality of effective pixel regions so that the second exposure condition and the third exposure condition become close to a first exposure condition which is used for obtaining a dark current component from the light-shielded region in a case that a temperature of the image sensor is higher than a predetermined temperature;
estimating one of the dark current component values contained in the pixel value which is output from one of the plurality of effective pixel regions by capturing with the second exposure condition, based on a conversion ratio of the first exposure condition to the second exposure condition; and
estimating an other of the dark current component values contained in the pixel value which is output from the other of the plurality of effective pixel regions by capturing with the third exposure condition which is different from the first exposure condition, based on a conversion ratio of the first exposure condition to the third exposure condition.

9. An image sensor comprising:
a photoelectric conversion sensor unit having an image capturing surface formed by a plurality of photoelectric conversion elements, the image capturing surface including a plurality of effective pixel regions and a light-shielded region for which exposure conditions are individually settable; and
at least one circuit configured to function as:
a restriction unit configured to restrict setting of a second exposure condition which is used for capturing of one of the plurality of effective pixel regions and a third exposure condition which is used for capturing of an other of the plurality of effective pixel regions so that the second exposure condition and the third exposure condition become close to a first exposure condition which is used for obtaining a dark current component from the light-shielded region in a case that a temperature of the image sensor is higher than a predetermined temperature; and
an estimation unit configured to estimate one of a dark current component values contained in a pixel value which is output from one of the plurality of effective pixel regions by capturing with the second exposure condition, based on a conversion ratio of the first exposure condition to the second exposure condition of the effective pixel region, and to estimate an other of the dark current component values contained in the pixel value which is output from the other of the plurality of effective pixel regions by capturing with the third exposure condition which is different from the first exposure condition, based on a conversion ratio of the first exposure condition to the third exposure condition.

10. A non-transitory computer-readable storage medium storing a program that causes a computer to execute an information processing method of estimating dark current component values contained in pixel values to be output from an image sensor, wherein:

an image capturing surface of the image sensor includes a plurality of effective pixel regions and a light-shielded region for which exposure conditions are individually settable, and the information processing method comprises:

restricting setting of a second exposure condition which is used for capturing of one of the plurality of effective pixel regions and a third exposure condition which is used for capturing of an other of the plurality of effective pixel regions so that the second exposure condition and the third exposure condition become close to a first exposure condition which is used for obtaining a dark current component from the light-shielded region in a case that a temperature of the image sensor is higher than a predetermined temperature;

estimating one the dark current component values contained in the pixel value which is output from one of the plurality of effective pixel regions by capturing with the second exposure condition, based on a conversion ratio of the first exposure condition to the second exposure condition of the effective pixel region; and estimating an other of the dark current component values contained in the pixel value which is output from the other of the plurality of effective pixel regions by capturing with the third exposure condition which is different from the first exposure condition, based on a conversion ratio of the first exposure condition to the third exposure condition.

* * * * *